A. WALLACE.
ELECTRIC LOCOMOTIVE TRUCK.
APPLICATION FILED AUG. 6, 1921.

1,397,472.

Patented Nov. 15, 1921.
3 SHEETS—SHEET 1.

Inventor:-
Allen Wallace.
by his Attorneys.
Howson & Howson

A. WALLACE.
ELECTRIC LOCOMOTIVE TRUCK.
APPLICATION FILED AUG. 6, 1921.

1,397,472.

Patented Nov. 15, 1921.
3 SHEETS—SHEET 3.

Inventor—
Allen Wallace.
by his Attorneys
Howson & Howson

UNITED STATES PATENT OFFICE.

ALLEN WALLACE, OF MOORESTOWN, NEW JERSEY, ASSIGNOR TO THE BALDWIN LOCOMOTIVE WORKS, OF PHILADELPHIA, PENNSYLVANIA, A CORPORATION OF PENNSYLVANIA.

ELECTRIC-LOCOMOTIVE TRUCK.

1,397,472.     Specification of Letters Patent.     Patented Nov. 15, 1921.

Application filed August 6, 1921. Serial No. 490,336.

*To all whom it may concern:*

Be it known that I, ALLEN WALLACE, a citizen of the United States, residing in Moorestown, New Jersey, have invented certain Improvements in Electric-Locomotive Trucks, of which the following is a specification.

My invention relates to certain improvements in electric locomotive trucks having three axles, in which there is an electric motor mounted at each axle, each axle being independently driven.

One object of my invention is to locate the pivot of the truck at, or near, the center of gravity of the locomotive truck weights at the rails and midway between the side frames of the truck.

A further object of the invention is to provide means for carrying the pivot, which is capable of being removed when it is necessary to gain access to the motor of the central axle.

A still further object of the invention is to mount the bolster frame on springs at each corner so that the cab will ride easily, the springs taking the roll of the cab.

Figure 1:
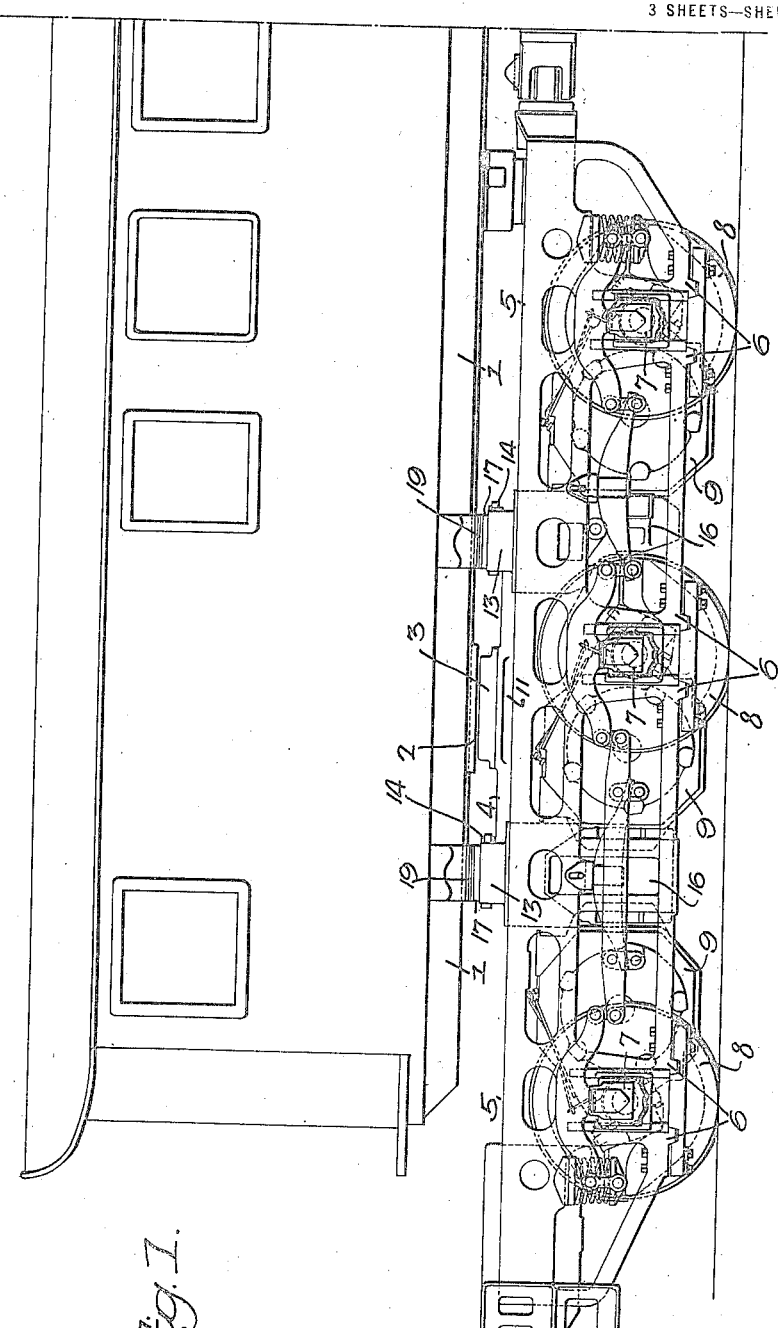
Figure 1 is a side view of a three-axle truck of an electric locomotive illustrating my invention.

Referring to the drawings, 1 is the lower portion of a cab of an electric locomotive having a pivot 2 adapted to the pivot bearing 3 on an H-shaped bolster frame 4. This pivot connection may be of any form desired without departing from the essential features of the invention. This H-shaped bolster frame is carried by the main truck frame, which has pedestals 6 for the axles 7 on which are the wheels 8. Each axle is independently driven from an electric motor 9, which is hung to the axle, in the present instance, as illustrated in Fig. 3, but may be otherwise mounted without departing from the spirit of the invention. The H-shaped bolster frame is clearly indicated in Fig. 2 and has two transverse members 10 connected by a central member 11 on which is mounted the center bearing 3 of the truck.

Figure 2:
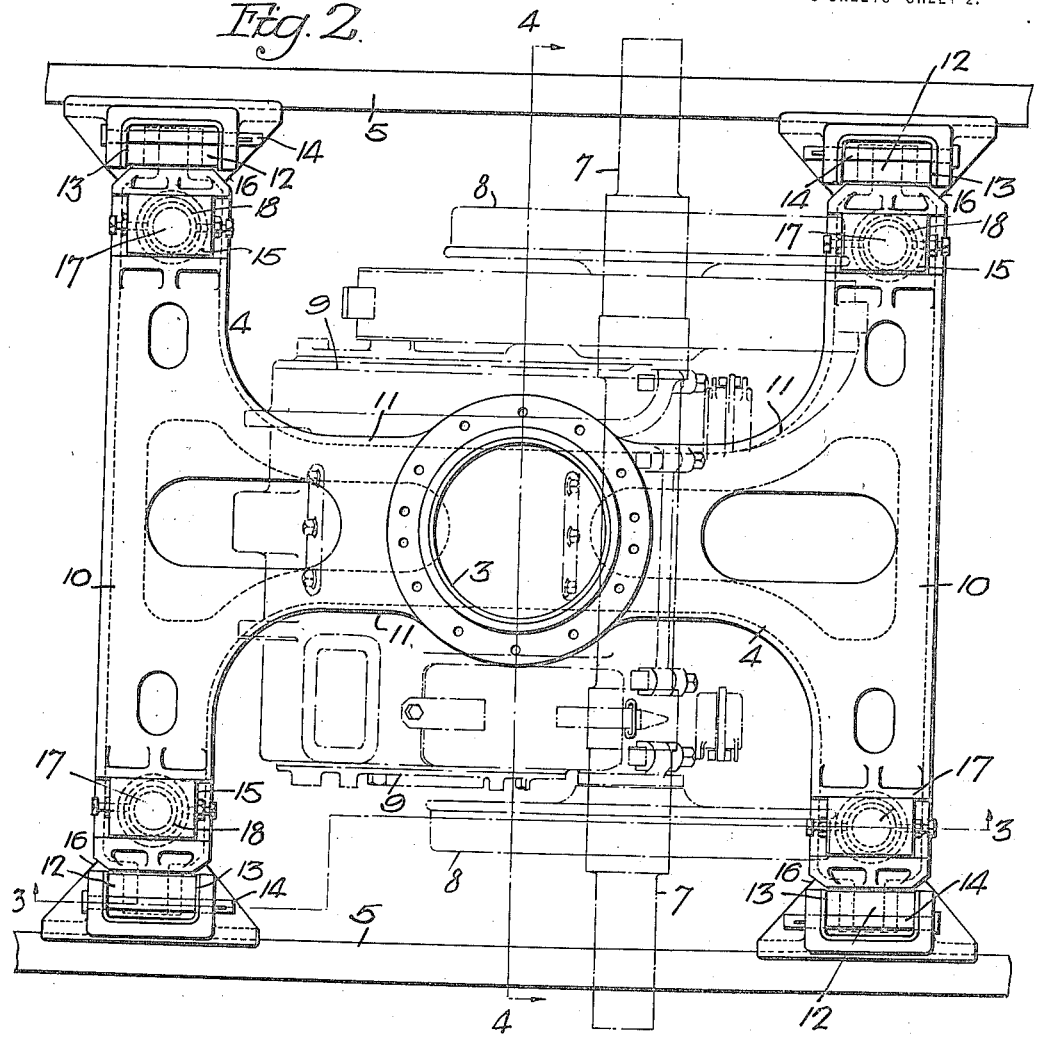
Fig. 2 is a plan view of the central portion of the truck, showing the H-shaped bolster frame in full lines and a motor in dotted lines.
Figure 3:
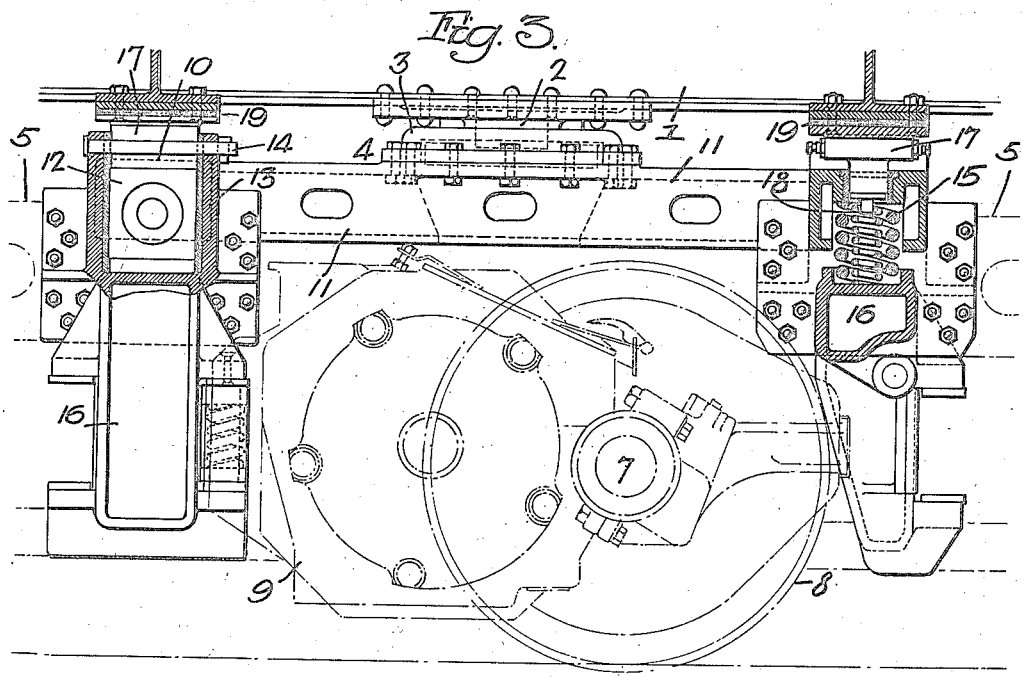
Fig. 3 is a sectional view on the line 3—3, Fig. 2.
Figure 4:
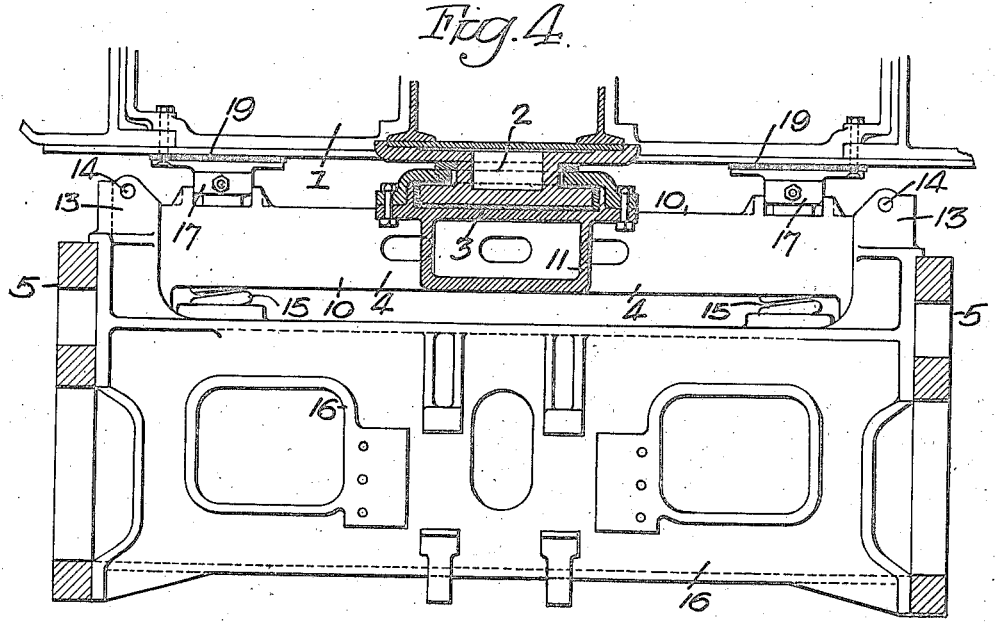
Fig. 4 is a sectional view on the line 4—4, Fig. 2.

It will be noted that the central axle 7 is not at the center of the truck but at one side thereof and the motor is directly under the center bearing, as clearly shown in Figs. 2 and 3. Consequently, there must be sufficient clearance at this point for the motor. In order to accomplish this, the center bearing is mounted on the H-shaped bolster frame, as illustrated, as the cross member of this frame can be so shaped as not to interfere with the motor. The transverse members 10 of the bolster frame extend to the side frame of the truck and reduced portions 12 extend into the sockets 13, being bolted to the side frames 5 of the truck and held from rising in these sockets by pins 14. The bolster frame rests on coiled springs 15 near the end of each of the transverse members 10. These coiled springs are carried by the cross frame 16 secured to the two side frames of the main frame. The sockets 13, in the present instance, are also formed in this frame 16.

By this construction, the bolster is spring-supported independently of the main springs of the truck and when it is desired to gain access to the motor of the central axle, all that is necessary is to jack up the cab and remove the truck, then withdraw the pins which hold the bolster in position and raise the bolster by a crane, which leaves the motor free of any obstructions.

In the present instance, carried by each transverse member of the bolster frame are side bearing plungers 17, which are adapted to bearings in the transverse members 10 and rest upon light coiled springs 18 within the main coiled springs 15. Directly above the side bearing plungers are the bearing plates 19, which are carried by the cab of the locomotive. The springs 15 and 18 act as single springs when the truck tends to tilt upward, due to the action of the motor.

It will be noticed that the ends of the bolster, which are located in the sockets, are free so that the frame of the truck can rise and fall without disturbing the horizontal position of the bolster.

I claim:

1. The combination in an electric locomotive truck of the three axle type in which each axle is independently driven by a motor, of a center bearing located at one side of the center axle to balance the truck; and an H-shaped bolster frame carrying the center frame and mounted on the side frames of the truck.

2. The combination of an electric locomotive truck having three axles; a motor for driving each axle; sockets at the side bearings; an H-shaped bolster frame carrying the center bearing of the truck and having its ends mounted in the sockets; means for supporting said frame; and means for holding the ends of the H-shaped frame in the sockets.

3. The combination of an electric motor truck having three axles; a motor for driving each axle; an H-shaped bolster frame mounted on the side frames of the truck and having a center bearing located above the motor which drives the center axle; and springs for supporting said bolster frame on the main frame.

4. The combination of an electric motor truck having three axles; a motor for driving each axle; an H-shaped bolster frame mounted on the side frames of the truck and having a center bearing located above the motor which drives the center axle; springs for supporting said bolster frame on the main frame; side bearing springs located within the springs which support the bolster; and side bearing flanges carried by the bolster frame in line with the side bearings of the cab of the locomotive.

ALLEN WALLACE.